Figure 2:
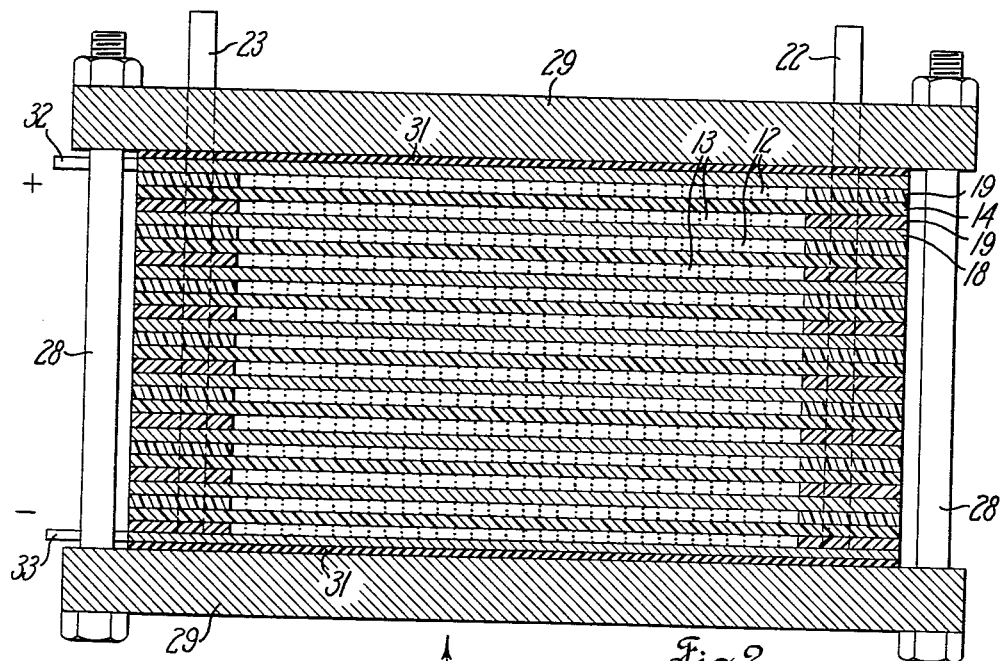

Dec. 5, 1961   N. P. VAHLDIECK   3,012,086
FUEL CELL
Filed July 17, 1957

Inventor
Nathan P. Vahldieck
By Henry J. Marciniale
Attorney 3,012,086
FUEL CELL
Nathan P. Vahldieck, Milwaukee, Wis., assignor to Allis-Chalmers Manufacturing Company, Milwaukee, Wis.
Filed July 17, 1957, Ser. No. 672,465
13 Claims. (Cl. 136—86)

This invention relates to the art of converting the chemical energy of a fuel directly to electrical energy by means of electrochemical reactions and more particularly to a process and a fuel cell of laminated construction used to carry out such reactions.

A fuel cell of the type with which this invention is concerned produces an electromotive force by bringing an oxidizing gas and a fuel gas in contact with two suitable electrodes and an electrolyte without mixing the gases. The oxidizing gas is introduced at the first electrode where it reacts electrochemically with the electrolyte to consume electrons at this electrode. At the same time, the fuel gas is introduced at the second electrode where it reacts electrochemically with the electrolyte to impart electrons to this electrode. Connecting the two electrodes by an external circuit causes an electrical current to flow in the circuit and withdraws electrical power from the cell.

Various attempts have been made to construct fuel cells of practical utility. Fuel cells using an aqueous electrolyte with fuel and oxidizing gases have been experimentally tested in the past and operated at both room and elevated temperatures. One of the more successful attempts to develop a fuel cell is described in the British Patent No. 725,661 to Francis T. Bacon. The Bacon cell operates at a temperature from 390° F. to 465° F. with an aqueous potassium hydroxide electrolyte at a pressure of between four hundred and eight hundred pounds per square inch. Another type of cell of the prior art uses molten salt as an electrolyte and is operated at temperatures above the melting temperature of the salt.

In the present invention the aqueous solutions and the molten salts used in the prior art as electrolytes are replaced by an ion permeable membrane. The membrane used in the preferred embodiment of this invention is an ion exchange resin in sheet form. The use of a solid electrolyte in sheet form makes it possible to laminate the individual cells of a fuel cell battery to obtain a higher energy output per unit volume. In a fuel cell of the type described in the Bacon patent referred to above, two cells combine to provide an approximate thickness of one inch. In accordance with the present invention, a fuel cell having as many as twenty cells per inch of thickness can readily be constructed. The increased number of cells per inch of thickness of the battery generally results in a corresponding increase in the energy output per unit volume.

A principal obstacle to the commercial adaptation of the fuel cells of the prior art has been the low energy output per unit volume as compared to a steam turbine electrical generator system. The use of a solid electrolyte made of an ion permeable membrane in sheet form as taught by the present invention overcomes this obstacle.

One of the difficulties encountered in the prior practice of using aqueous or molten salt electrolytes is that reasonable current densities cannot be obtained without some concentration polarization in the electrolyte. Polarization in the electrolyte results, of course, in a decrease of the cell efficiency. In the prior art attempts were made to reduce the concentration polarization by circulating the liquid electrolyte. In the present invention concentration polarization in the electrolyte has been effectively minimized. Concentration gradients do not occur in the present membrane type of electrolyte since the ions travel through the membrane by an ion exchange process.

The use of an aqueous solution or molten salt as an electrolyte in a fuel cell poses many problems that are eliminated by the use of a solid type of electrolyte. The necessity for using a circulating pump or thermal siphon and for maintaining precise pressure gradients across the electrodes to prevent flooding the electrodes with electrolyte is eliminated. A fuel cell comprising a plurality of membranes can be readily disassembled for maintenance and repairs and is easily controlled during operation.

It is therefore an object of the present invention to provide an improved fuel cell which by electrochemical reactions of a fuel gas and oxidizing gas produces electrical power.

Another object of the present invention is to provide a fuel cell utilizing an ion permeable membrane fabricated of an ion exchange resin in sheet form that can be readily laminated to permit a maximum number of individual cells per unit of thickness.

It is a further object of the present invention to provide a fuel cell in which the concentration polarization in the electrolyte is significantly reduced.

A still further object of this invention is to provide an improved fuel cell that can be readily disassembled and maintained in operation.

It is still a further object of the present invention to provide a fuel cell that can be efficiently operated at normal atmospheric temperatures.

Figure 1:
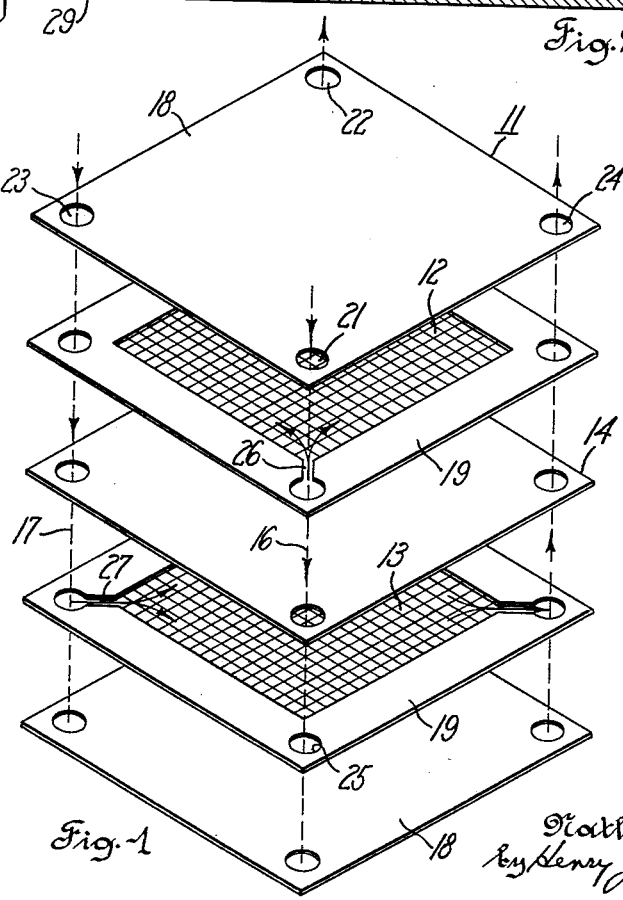

Other objects and advantages of this invention are made apparent in the following specifications by reference to the accompanying drawing, wherein:

FIG. 1 is a perspective view of an individual fuel cell with the individual laminations exploded to illustrate the structural features and operation of the present invention; and FIG. 2 is an enlarged side view of an assembly of the individual fuel cells as shown in FIG. 1.

Referring specifically to FIG. 1 of the drawing, a single unit fuel cell of the present invention is shown in exploded form. In general, the fuel cell unit 11 is comprised of the following components, a platelike oxidizing electrode 12, a platelike fuel gas electrode 13, a solid platelike electrolyte 14 consisting of an ion permeable membrane, an oxidizing gas circuit 16, a fuel gas circuit 17, spacer plates 18 and electrode gaskets 19. Although the electrodes 12, 13, the spacer plates 18 and gaskets 19, as described herein, are shaped in the form of thin flat quadrilateral plates, it should be readily apparent that they may be constructed in other suitable forms.

The oxidizing electrode 12, as the term is used herein, identifies the electrode 12 to which a gas containing a suitable oxidant is passed. The oxidizing electrode 12 serves as the anode while the fuel gas electrode 13 functions as the cathode of the individual cell 11 and is maintained in a parallel spaced relationship to the fuel gas electrode 13 by the solid electrolyte 14 which is interposed between two electrodes 12, 13. The electrodes 12, 13 may be fabricated of any suitable porous or nonporous gas permeable material having the proper catalytic properties. If a substantially nonporous material is used, it should be used in the form of a wire screen or a perforated or corrugated sheet. It is extremely desirable to provide large reacting surfaces to allow the gases to permeate the electrodes 12, 13, since the electrochemical reactions occur at the points where the electrodes 12, 13, the electrolyte 14 and the gas come in contact, such a point of contact being referred to herein as a three phase junction. Sintered porous metals may be used as electrodes with some advantage. In the preferred embodiment of the cell illustrated in FIG. 1 platinized nickel wire cloth (100 mesh), platinized silver and platinized platinum wire cloth (52 mesh) were used.

The present invention resides in a large measure in the method and a construction utilizing an ion permeable and gas impermeable membrane as the solid electrolyte 14 in a gaseous fuel cell 11. Various ion permeable membranes are readily available commercially and can be successfully used to practice the present invention. A suitable membrane is one that has a low electrical resistance and a high ion permeability. It is also important that the ion exchange material be capable of being fabricated in thin sheet form to permit an assembly of individual cells into a multicell battery by a process of laminating thin sheets of the ion permeable membrane against the thin sheets comprising the electrodes 12, 13 of the individual cells 11.

It should be noted that ion selectivity of a particular membrane is not controlling in the practice of the present invention. It was found that both anion and cation permeable membranes could be used. Membranes made from an ion exchange resins on cloth backing gave good results, and had higher mechanical strength than unsupported membranes. Likewise, the material selected as an ion permeable membrane should be impermeable to the gases used. That is, it should provide a positive separation between the fuel gas and oxidizing gas to prevent any direct mixing of the gases. Anion permeable membranes used to practice the present invention are equilibrated with a solution of a strong base, such as sodium hydroxide, to convert them completely to the hydroxide form. Cation permeable membranes are equilibrated with a solution of a strong mineral acid, such as sulfuric acid, to convert them completely to the hydrogen form.

The oxidizing and fuel gas circuits 16, 17, as identified in FIG. 1 by the numbered arrows, include the inlet and outlet conduits 21, 22, 23, 24 formed by holes 25 formed at diametrically opposite corners of the cell laminations. Conduits 21, 22, 23 and 24 are in communication with the electrodes 12, 13 by means of passage 26, 27. It should be noted that the oxidizing and fuel gas streams do not physically mix but remain separated in the course of their passage through an individual cell 11. The gases are introduced into the cell 11 by a suitable pumping means or other pressure source (not shown). The oxidizing gas enters into the inlet conduit 21 and passes through the connecting passage 26 to contact the electrode 12. A slight pressure differential is maintained between the inlet conduit 21 and the outlet conduit 22 so that the oxidizing gas can blanket the entire area of the electrode 12. A sufficient amount of gas is circulated to prevent buildup of impurities and remove excess water vapor. The oxidizing gas may leave by way of the passage 26 connecting with the outlet conduit 22. Thus, it is possible to recirculate the gas through the cell 11.

The fuel gas introduced into the cell 11 follows a similar path of flow. Fuel gas is conducted to inlet conduit 23 and then through the connecting passage 27 to come in contact with the electrode 13. It may leave the electrode 13 by way of the passage 27 connecting with the outlet conduit 24. The inlet and outlet conduits 23, 24 are located at opposite corners of the cell 11 to facilitate purging. Also, the spacer plates 18 and the ion permeable membrane 14 confine the travel of the gas currents in parallel planes. In normal operation on pure gases, the amount of gas leaving the electrodes is negligible. Most of the gas blanketing the electrode is consumed. However, the water vapor formed at the electrode will have considerable volume.

To form a sealed compartment for the oxidizing and fuel gas currents in the electrode space, the electrode gaskets 19 are provided. The thickness of the gasket 19 is chosen so that the electrodes 12, 13 are firmly pressed against the ion permeable membrane 14 so that numerous electrode to electrolyte contact points may be established. The gasket 19 sealing the oxidizing electrode 12 is identical to the one sealing the fuel gas electrode 13. Each gasket 19 is provided with four holes 25 at the corners which join with the holes in the other laminations to form the outlet and inlet conduits 21, 22, 23 and 24.

In the gasket provided for the fuel gas electrode 13 a connecting passage 27 is formed to direct the gas flow to the electrode 13 and no connecting passage is provided at the oxidizing gas conduits 21, 22. In the gasket for the oxidizing electrode 12, connecting passages 26 are provided only for the oxidizing gas conduits 21, 22. It should be apparent that the passages 26, 27 can also be machined on the surface of the spacer plates 18 instead of in the gaskets.

Referring to FIG. 2, a battery is constructed by laminating a plurality of unit cells 11. For the purpose of illustrating the arrangement, the thickness of the laminations as shown are greatly exaggerated. The unit cells 11 are assembled in such a manner that each spacer plate 18 serves to connect two adjacent cells in series electrically to obtain an increased voltage output. All of the laminations are pressed together by a plurality of stay bolts 28 which pass through holes in end plates 29 which are insulated from the cell assembly by the insulation 31. The oxidizing electrode 12 of the end cell is electrically connected to a suitable conductor 32 and the fuel gas electrodes 13 of the cell at the opposite end of the assembly is electrically connected to a suitable conductor 33. The individual cells may be connected in parallel when it is desired to increase the amperage or current capacity by using insulating plates 18 instead of plates made of conductive material.

The operation of the fuel cell of the present invention will now be described in connection with the use of oxygen as an oxidizing gas and hydrogen as a fuel gas. It was found that air can also be successfully used as the oxidizing gas. However, in the preferred embodiment of this invention, oxygen is supplied to the inlet conduit 21 from which it is diffused through oxidizing electrode 12. Although the exact mechanism that takes place within the cell 11 is not fully understood, the one possible reaction that takes place at the oxidizing electrode 12 is as follows:

$$O_2 + 2H_2O + 4e \rightarrow 4OH^-$$

The negative hydroxyl ions resulting from the above reaction migrate through the ion permeable membrane 14 to the fuel gas electrode 13 where the following reaction occurs:

$$2H_2 + 4OH^- \rightarrow 4H_2O + 4e$$

The excess electrons at the fuel gas electrode 13 can flow to the oxidizing electrode 12 when the electrodes 12, 13 are connected by an external electrical circuit.

Alternatively it is possible that the hydrogen ionizes at the fuel electrode as follows:

$$2H_2 \rightarrow 4H^+ + 4e$$

The hydrogen ions migrate through the ion permeable membrane to the oxidizing electrode where the following reaction occurs:

$$O_2 + 4H^+ + 4e \rightarrow 2H_2O$$

Theoretically, an anion permeable membrane in the hydroxide form should be more efficient if the first mechanism is correct and a cation permeable membrane, if the second mechanism is correct. It was found, however, that both types of membranes worked about equally well. This may be due to the fact that both mechanisms take place simultaneously or that anion permeable membranes pass some hydrogen ions and cation permeable membranes pass some hydroxyl ions.

As indicated by the electrode reaction equations given above, water is possibly consumed at one electrode and is formed at the other electrode. The water formed at an electrode can readily be removed by recycling the gas stream and condensing out the water. It was also found necessary to humidify the gas streams to prevent the ion permeable membrane from drying out. If necessary, the cells can be prevented from heating up during extended operation by recirculating and cooling the gas streams.

It should be apparent that a significant practical consequence resulting from the use of thin ion permeable membranes is that an increased power output per unit volume of the battery can be obtained. As previously stated, the power output per unit volume is an important factor in determining the economic feasibility of a particular cell. Based on the results of the test of individual cells as set forth in the examples cited herein to exemplify the present invention, a power output of about 1.2 kw. per cubic foot is attainable. Improved catalytic properties in the electrodes would probably increase this figure.

Representative examples of the specific preparation and construction of individual cells utilizing an ion permeable membrane as the electrolyte of a gaseous fuel cell in accordance with the present invention are described as follows:

EXAMPLE I

A cell was constructed of a rectangular sheet of an anion permeable membrane identified commercially as Amberplex A-1 manufactured by Rohm and Haas Company of Philadelphia, Pennsylvania. This membrane was first equilibrated with a sodium hydroxide solution (eighty grams of sodium hydroxide in four hundred milliliters of solution). Two 100 mesh nickel wire cloth electrodes approximately three inches by four inches in size were first platinized by immersing in a platinum chloride solution. The membrane was then sandwiched between the two nickel wire electrodes and this assembly placed between plates made of a polymethyl methacrylate plastic (Lucite). The ends plates were approximately four inches by five inches. The cell was held together by a suitable clamping means. A source of oxygen was connected to an inlet opening on an end plate and a source of hydrogen was connected to the inlet opening on the other end plate. The electrodes were not sealed at the edges and excess gas was permitted to escape at the edges of the electrodes.

One edge of each electrode was allowed to extend beyond the end plate to permit electrical connections to be made directly to the nickel wire cloth. When the fuel gas and the oxidizing gases were admitted to the electrodes, it was found that a potential of .98 volt was developed. The test cell was able to operate either a small flashlight bulb or an electric motor. To prevent the membrane from drying out, it was found to be necessary to humidify the hydrogen and oxygen by passing the gases through water before introduction to the cell. Using standard resistors of various sizes as an external electrical load for the battery, the power output corresponding to a measured voltage was determined. These results are summarized in Table I below as follows:

Table I

| Resistance Ohm | Volts | Power, milliwatts |
| --- | --- | --- |
| 32 | .86 | 23 |
| 16 | .81 | 41 |
| 8 | .74 | 68 |
| 4 | .62 | 96 |
| 2 | .48 | 113 |
| 1 | .32 | 102 |

During the collection of the data given in Table I, the gas flow was maintained at a constant rate. It was found that the power output of this individual cell was a function of the gas flow rate. As the flow rate was increased, the power output of the cell was proportionately increased. To cite an example, when the flow rate was increased with the one ohm resistance in the external circuit, a power output of two hundred and fifty milliwatts was obtained as compared with the one hundred two milliwatts given in Table I above.

EXAMPLE II

A unit cell similar to the one described in Example I was constructed using a cation permeable membrane identified commercially as Amberplex C-1 manufactured by Rohm and Haas Company of Philadelphia, Pennsylvania. The electrodes used were fabricated of 52 mesh wire cloth of platinized platinum approximately two and one quarter inches by three and three quarter inches in size. The cell was operated with hydrogen as a fuel gas and oxygen as the oxidizing gas. The end plates were of identical construction as those described in Example I. To compare the results obtainable by using a cation permeable membrane with the results obtainable from an anion permeable membrane, the cell was operated with both types of membranes. The cation permeable membrane was equilibrated with a sulfuric acid solution, and the anion permeable membrane was equilibrated with a sodium hydroxide solution. The gas flow rates were approximately the same in both cases. These results are compared in Table II below:

Table II

| Resistance (Ohms) | Volts Using Anion Permeable Membrane | Volts Using Cation Permeable Membrane |
| --- | --- | --- |
| 6.4 | .68 | .74 |
| 3.2 | .53 | .67 |
| 1.6 | .36 | .56 |
| .8 | .20 | .45 |
| .4 | .11 | .32 |
| .2 | .06 | .20 |

EXAMPLE III

A single unit fuel cell was constructed with gaskets interposed between the spacer plates and the ion exchange membranes. The electrodes were constructed of three and one half inch square sheets of platinized 100 mesh nickel wire cloth. The gaskets were fabricated of polyethylene plastic and were similar to those shown in FIG. 1 of the drawings. Since only a single fuel cell was being operated, gas inlet and outlet openings were provided only in the end plates. Two different commercially available anion permeable membranes were used in tests conducted on this cell, Amberplex A-1 manufactured by Rohm and Haas Company of Philadelphia, Pennsylvania, and Nepton AR111AD manufactured by Ionics, Inc. of Cambridge, Massachuletts. The membranes were equilibrated with two, five and eight normal sodium hydroxide solutions. After the electrode compartments were thoroughly purged, gas flow rate had little effect on cell output. The power outputs for cells using the two different membranes treated with the two, five and eight normal sodium hydroxide solutions were found to be as follows:

Table III

POWER OUTPUT (MILLIWATTS)

| Resistance Ohms | A-1 2 N | AR-111 2 N | A-1 5 N | AR-111 5 N | A-1 8 N | AR-111 8 N |
| --- | --- | --- | --- | --- | --- | --- |
| 12.8 | 61 | 59 | 60 | 59 | 58 | 59 |
| 6.4 | 108 | 107 | 109 | 108 | 104 | 106 |
| 3.2 | 185 | 184 | 187 | 188 | 171 | 176 |
| 1.6 | 289 | 289 | 291 | 298 | 240 | 225 |
| .8 | 378 | 378 | 378 | 399 | 268 | 211 |
| .4 | 386 | 400 | 386 | 415 | 263 | 163 |
| .2 | 306 | 313 | 313 | 364 | 176 | 109 |
| .1 | 225 | 240 | 225 | 272 | 121 | 81 |

The principles of the invention described above in connection with the specific exemplifications will suggest other modifications and applications. It is accordingly desired that the present invention shall not be limited to the specific exemplifications shown or described therein.

What is claimed is:

1. A fuel cell unit adapted to be laminated with like cell units to construct a fuel cell battery, said fuel cell unit comprising: a centrally disposed solid electrolyte constructed in the form of a platelike equilibrated gas impermeable and ion permeable membrane, a first platelike electrode formed of a gas permeable and conductive material and laminated on one side of said membrane, a second platelike electrode formed of a gas permeable and conductive material and laminated to the other side of said membrane, a spacer plate laminated to the side of each of said electrodes remote from said electrolyte, and a plurality of discrete ports defined through said spacer plates, said electrodes and said electrolyte in alignment with each other and coacting to define a plurality of discrete passages therethrough, one pair of said passages being communicable with said first electrode, and not said second electrode, to permit the flow of an oxidizing gas therebetween in contact with said first electrode, another pair of said passages being communicable with said second electrode, and not said first electrode, to permit the flow of a fuel gas therebetween in contact with said second electrode.

2. A fuel cell unit adapted to be laminated with like cell units to construct a fuel cell battery, said fuel cell unit comprising: a centrally disposed solid electrolyte constructed in the form of a platelike anion permeable ion exchange resin membrane impermeable to gases and equilibrated with a solution of a strong base, a first platelike electrode formed of a gas permeable and conductive material and laminated on one side of said membrane, a second platelike electrode formed of a gas permeable and conductive material and laminated to the other side of said membrane, sealing means to prevent escape of gas from said electrode, and a plurality of discrete ports defined through said electrodes and said electrolyte in alignment with each other and coacting to define a plurality of discrete passages therethrough, one pair of said passages beings communicable with said first electrode, and not said second electrode, to permit the flow of an oxidizing gas therebetween in contact with said first electrode, another pair of said passages being communicable with said second electrode, and not said first electrode, to permit the flow of a fuel gas therebetween in contact with said second electrode.

3. A fuel cell unit adapted to be laminated with like cell units to construct a fuel cell battery, said fuel cell unit comprising: a centrally disposed solid electrolyte constructed in the form of a platelike cation permeable ion exchange resin membrane impermeable to gases and equilibrated with a solution of a strong mineral acid, a first platelike electrode formed of a gas permeable and conductive material and laminated on one side of said membrane, a second platelike electrode formed of a gas permeable and conductive material and laminated to the other side of said membrane, sealing means to prevent escape of gas from said electrodes, and a plurality of discrete ports defined through said electrodes and said electrolyte in alignment with each other and coacting to define a plurality of discrete passages therethrough, one pair of said passages being communicable with said first electrode, and not said second electrode, to permit the flow of an oxidizing gas therebetween in contact with said first electrode, another pair of said passages being communicable with said second electrode, and not said first electrode, to permit the flow of a fuel gas therebetween in contact with said second electrode.

4. A fuel cell of laminated construction comprising a first end plate; a first gasket mounted electrode plaque adjacent said end plate in abutting relationship thereto; a platelike solid electrolyte formed of an equilibrated ion-permeable gas-impermeable membrane overlapping said gasket-mounted electrode plaque in intimate surface engagement therewith; a second gasket mounted electrode plaque adjacent said electrolyte in intimate surface engagement therewith; a second end plate adjacent said second gasket mounted electrode plaque in abutting relationship thereto; means for securing said end plates relative to each other to secure said electrodes and electrolyte therebetween, said means being electrically insulated from said electrodes; and a plurality of discrete passages defined in registry through said end plates, gaskets and electrolyte and coacting to independently direct an oxidizing gas into and out of contact with said first of said gasket mounted electrodes and a fuel gas into and out of contact with said second of said gasket-mounted electrodes.

5. The fuel cell according to claim 4 in which the electrodes are formed of a porous material.

6. The fuel cell according to claim 4 in which the electrodes are formed of a foraminous nonporous material.

7. The fuel cell according to claim 4 in which the gasket mounted electrodes define a gas space in which the gas inlet and gas outlet are maintained at a pressure differential.

8. The fuel cell according to claim 4 in which the oxidizing gas is selected from the group consisting of oxygen and air.

9. The fuel cell according to claim 4 in which the fuel gas contains hydrogen.

10. A fuel cell unit comprising a first gas permeable thin electrode plaque; resilient frame means circumscribing said plaque in supporting engagement therewith and including a first passageway defined therein to direct oxidizing gas into contact with the surfaces of said said electrode plaque and a second passageway defined therein remote of said first passageway to direct said oxidizing gas therefrom; a second gas permeable thin electrode plaque disposed in spaced generally parallel relationship to said first plaque; resilient frame means circumscribing said second plaque in supporting engagement therewith and including a first passageway defined therein to direct fuel gas into contact with the surfaces of said second plaque and a second passageway defined therein remote of said first passageway to direct said fuel gas therefrom; a thin solid electrolyte formed of an equilibrated gas-impermeable ion-permeable membrane interposed between and in intimate overlapping surface engagement with said plaques and sealingly engaged between said frame means; and supply means independently conducting an oxidizing gas and a fuel gas to the corresponding one of said passages.

11. A fuel cell unit comprising a first gas permeable thin electrode plaque; resilient frame means circumscribing said plaque in supporting engagement therewith and including passageways defined therein to direct oxidizing gas into and out of contact with the surfaces of said electrode plaque; a second gas permeable thin electrode plaque disposed in spaced generally parallel relationship to said first plaque; resilient frame means circumscribing said second plaque in supporting engagement therewith and including passageways defined therein to direct fuel gas into and out of contact with the surfaces of said second plaque; a thin solid electrolyte formed of a gas-impermeable ion-permeable membrane interposed between in overlapping intimate surface engagement with said plaques and sealingly engaged by said frame means, one on each side thereof; and means for separately conducting an oxidizing gas and a fuel gas to the corresponding one of said passages.

12. A fuel cell comprising: a first frame member having a body portion and an opening defined therethrough and circumscribed by said body portion; a first gas permeable electrode plaque encased in and carried by said first frame member in said opening, said frame member having a plurality of discrete ports, defined through said body portion in spaced noncommunicative relationship to each other and to said opening, and a pair of discrete elongated slots, each of said slots connecting a different one of said ports to said opening to permit the ingress and egress of a first gas therethrough in contact with said plaque; a second frame member having a body portion and an opening defined therethrough and circumscribed by said body portion; a second gas permeable electrode plaque encased in and carried by said second frame member in said opening, said second frame member having a plurality of discrete ports, defined through said body portion in spaced noncommunicative relationship to each other and to said opening, said ports being in registry with said ports in said first frame member, and a pair of discrete elongated slots, each of said slots connecting a different one of a pair of said ports, being in nonregistered relationship to said slot-connected ports in said first frame member, to said opening to permit the ingress and egress of a second gas therethrough in contact with said second plaque, said second gas being independent of said first gas; a thin solid electrolyte, formed of a gas impermeable and ion permeable membrane, interposed between in intimate surface contact with said electrode plaques and in gastight engagement with said frame members; and means supplying one of said slot-connected ports in said first frame member and one of said slot-connected ports in said second frame member with an independent ingress of fuel gas and oxidizing gas, respectively.

13. A fuel cell comprising: a first rectangular frame member having a body portion and a rectangular opening defined therethrough and circumscribed by said body portion; a first gas permeable electrode plaque encased in and carried by said first frame member in said opening, said frame member having four discrete ports defined through said body portion, one being adjacent each of the corners thereof and in spaced noncommunicative relationship to said opening, and a pair of discrete elongated slots each connecting one of a diagonally opposed pair of said ports to said opening to permit the ingress and egress of a first gas therethrough in contact with said plaque; a second frame member having a body portion and an opening defined therethrough and circumscribed by said body portion; a second gas permeable electrode plaque encased in and carried by said second frame member in said opening, said second frame member having a plurality of discrete ports defined through said body portion, one being adjacent each of the corners thereof and in spaced noncommunicative relationship to said opening, said ports being in registry with said ports in said first frame member, and a pair of discrete elongated slots, each connecting one of a diagonally opposed pair of said ports to said opening to permit the ingress and egress of a second gas therethrough in contact with said second plaque, said last named diagonally paired ports being in nonregistered relationship to said diagonally paired ports in said first frame member, said second gas being independent of said first gas; a thin solid electrolyte, formed of a gas impermeable and ion permeable membrane, interposed between in intimate surface contact with said electrode plaques and in gastight engagement with said frame members; and means supplying one of said diagonally paired ports in said first frame member and one of said diagonally paired ports in said second frame member with an independent ingress of fuel gas and oxidizing gas, respectively.

References Cited in the file of this patent

UNITED STATES PATENTS

| | | |
|---|---|---|
| 1,182,759 | Emanuel | May 9, 1916 |
| 2,276,188 | Greger | Mar. 10, 1942 |
| 2,636,851 | Juda et al. | Apr. 28, 1953 |
| 2,913,511 | Grubb | Nov. 17, 1959 |

OTHER REFERENCES

Ion Exchange by Frederick C. Nachod, page 169.